Patented July 26, 1927.

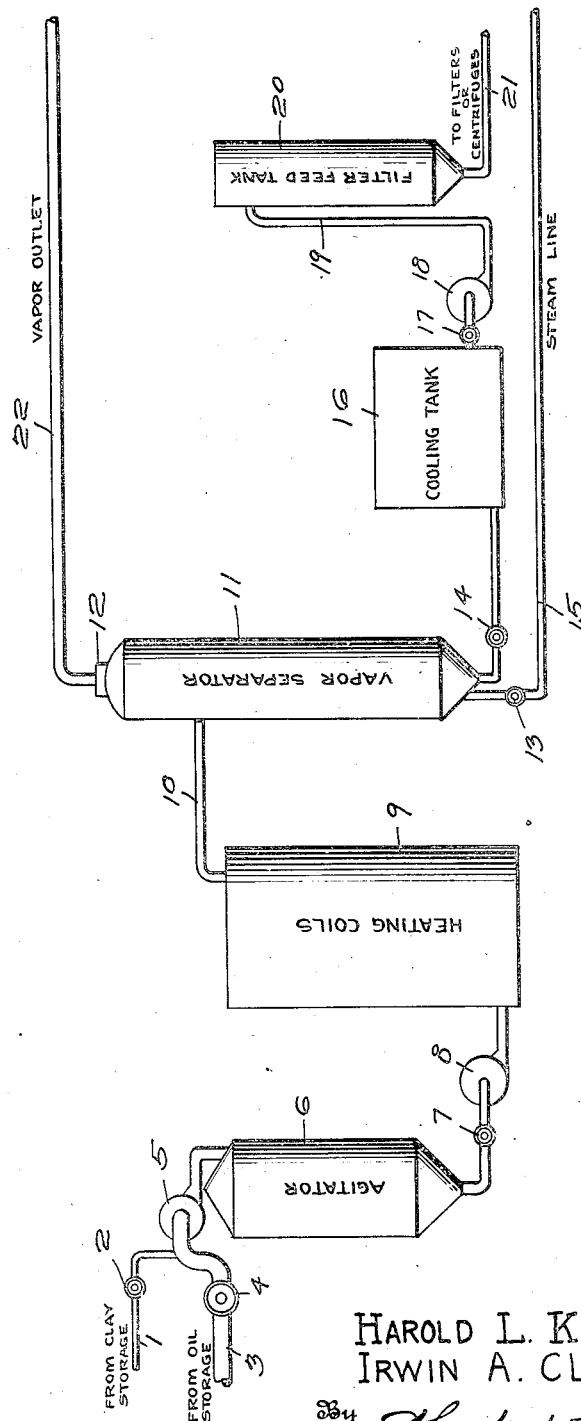

1,636,938

UNITED STATES PATENT OFFICE.

HAROLD LESTER KAUFFMAN AND IRWIN ARTHUR CLARK, OF DENVER, COLORADO, ASSIGNORS, BY MESNE ASSIGNMENTS, TO SAID KAUFFMAN.

ART OF DECOLORIZING, CLARIFYING, AND PURIFYING PETROLEUM OILS.

Application filed November 11, 1924, Serial No. 749,353. Renewed February 25, 1927.

This invention relates to improvements in the art of decolorizing, clarifying and purifying petroleum oils by the use of untreated or finely divided clays and similar filtering materials containing enough water to form a viscous, cohesive mass sufficiently fluid to be pumped through pipes. Although this invention is not limited to any particular petroleum product it refers more especially to lubricating oils derived from crude oils of the Rocky Mountain region.

The term clay in this invention is used in a broad sense to include fuller's earths, diatomaceous earths, clays of the kaolin and related groups, bentonites and other altered volcanic ashes, tuffs, breccias and pyroclasts, and clay minerals such as halloysite, montmorillonite, pyrophyllite, leucite, etc., and other filtering materials of similar characteristics.

The coloring matter of petroleum oils, more particularly lubricating oils, is due mainly to the presence of substances of a bituminous or asphaltic nature, as well as to the presence of various complex sulphur and nitrogen compounds. In addition to these substances it also is very probably due to various colloidal and dissolved impurities such as finely divided and colloidal carbon, complex tarry compounds of high molecular weight, etc.

The removal of substances producing color in a petroleum oil is generally understood to be dependent upon the phenomenon known as adsorption. Adsorption consists in the removal from a solution a part of the solute when a solid body is introduced therein. Where adsorption is possible the free layer of the solution possesses a concentration differing from the body of the solution, while at the same time there takes place a change in concentration with a resulting great decrease of the surface tension. Furthermore, if the latter is decreased in the solvent by an increase in the concentration of the dissolved substance the latter will try to concentrate in the surface layer. By the surface layer is meant every surface that divides the solution from some other substance, either solid, liquid or gaseous. Hence, if a solid body is introduced into a solution, a new surface is created, and if the surface tension of the solution at the surface of contact with the introduced substance is so influenced by the dissolved substance that it becomes smaller with the increase in concentration of the latter, then an increase in concentration of the dissolved substances will take place at the surface of contact. If the solution is removed from the solid body, the layer with the high concentration of the solute remains attached to the solid body. In other words the solid body has adsorbed a portion of the solute, and the solution that remains is now less concentrated than it was originally. This is the most generally accepted physical explanation of the adsorption process.

However, when a decolorizing agent is introduced into a petroleum oil there also takes place certain changes in the oil itself that are of a chemical nature, such as polymerization of tarry, asphaltic and bituminous substances, unsaturated hydrocarbons, etc. The adsorbent, therefore, acts also as a polymerizing agent.

The usual method employed in improving the color of petroleum oils, particularly lubricating oils, is to percolate the oil through a column of coarse fuller's earth, with or without the aid of pressure, thereby removing part of the coloring matter and solid particles in the oil. Heavy oils are sometimes diluted with gasoline, or other solvent, to facilitate percolation through the clay. A 16—30 mesh clay is usually used on heavy oils while a 30—60 mesh clay is more efficient on the lighter oils.

The disadvantages of this process lie mainly in the fact that several days are required for the complete utilization of the clay, and it is impossible to get the entire through-put to a uniform color without blending, since fractions are obtained that vary greatly in color.

It has long been known in the art that by mixing an oil with a decolorizing agent the process of decolorizing and purifying the oil is accomplished in a much shorter period of time than by the process of percolation. More efficient results are obtained in this process by the use of finely divided filtering material of from 100 to 200 mesh, since more adsorptive surface is offered to the oil to be treated with the same amount of clay. The clay and oil are usually mechanically intermixed, heated to the temperature at which the maximum adsorptive capacity of the clay is reached and the spent clay is then separated from the oil by any suitable means, either before or after the mixture is cooled.

We have discovered by practical experimentation on clays that have come under our observation, particularly those clays found in the Rocky Mountain region, that to be used most effectively they should be commingled with the oil to be treated, while containing enough moisture to form a viscous, cohesive mass sufficiently fluid to be pumped through pipes, and after heating the mixture should be steamed down to a temperature slightly in excess of the temperature of boiling water.

We have also found that in treating certain oils an even higher efficiency is obtained by the addition of certain substances of an organic or inorganic composition which have no practical value under ordinary treating conditions in increasing the efficiency of filtering materials, but which we have found to be of decided value when intermixed with the oil and clay containing sufficient moisture to form a viscous and cohesive mass. We do not wish to limit ourselves to any particular substance or substances, nor the quantity of the same that is to be added to the mixture, because of the varying effects of different substances when intermixed with various oils and filtering materials. However, by way of illustration, we may mention zinc chloride which we have used successfully and to an economic advantage when intermixed with clays of the Rocky Mountain region containing sufficient moisture to form a viscous and cohesive mass, in treating oils derived from crude oils from this same region. It is to be understood that the invention is not limited to the use of zinc chloride but that the use of any material having the characteristics defined above or which exert an advantageous action in the presence of superheated steam which they would not otherwise have, is within the scope of the invention. All such materials are included in the term catalyst as used in the appended claims.

We are not fully aware of all the reasons for the increased efficiency obtained by treating oils with a filtering material containing sufficient moisture to form a viscous and cohesive mass, but we believe that the steam, generated from the moisture in the filtering material when intermixed with the oil and heated, enormously increases the adsorptive surface of the clay by clearing the microscopic channels of the internal structure of the material of adsorbed gases and water soluble salts, thereby increasing its efficiency. Also, as the steam generated from the particles of wet clay passes out of the clay particles the oil diffuses into the microscopic channels of the clay and the maximum adsorptive value of the surface is realized as the surface has no opportunity to adsorb gases from the air or time to permit of conversion of amorphous silica into the less adsorptive crystalline form. Furthermore, we believe that the commingling of the oil with a filtering material containing moisture increases the surface layer of the oil due to the surface created between the oil and water, or the steam to which it is converted on heating the mixture, thereby greatly increasing the surface layer of the oil with a resultant decrease of the surface tension, and thus further concentrating the dissolved impurities in the free layer of the oil, rendering a larger percentage of these impurities more susceptible to adsorption. Still further, we believe that steam generated by heating the wet clay when mixed with the oil aids in polymerizing the unsaturated, asphaltic and bituminous substances in the oil into larger molecular residues thereby rendering them more susceptible to adsorption by the filtering material.

Adsorbed impurities cannot be removed by washing but can be removed by displacement by other substances and in equal quantities. This however, is a mass action. It is evident that the impurities of petroleum oils have a greater affinity for the adsorptive surfaces of solid substances than do the individual molecules of water making up steam. However, these impurities once adsorbed can be replaced by hot water or steam when in excess due to mass action as shown in recovering spent clay in this manner. It is possible that when these asphaltic and bituminous substances are adsorbed on the surface of a solid particle they are not only polymerized into larger molecular residues but are also lumped together in large particles which when displaced by steam are removable from the oil by subsequent filtration and the solid particles of the filtering material thus freed of the adsorbed impurities will again adsorb more impurities from the oil as they come into contact with the oil again during agitation.

Thus a continuous cycle is established which is limited only by the ultimate decrease of the concentration of the dissolved impurities to a point where the influence of the solid particles of the adsorbent on the concentration of these dissolved impurities in the surface layer of the oil is not sufficient for adsorption to take place. Such a cycle of adsorption, displacement and repeated adsorption could reach this ultimate point of low concentration only under the most ideal conditions, impossible with the complex composition of petroleum oils, but we believe such changes do take place to an extent that greatly increases the decolorization of oils so treated.

Further, the adsorption of impurities by particles of the clay may also be due to the fact that in acid solutions, i. e. acid treated oils, asphaltic material is positively charged;

while, in contact with water or steam, the adsorbent becomes negatively charged and an asphaltic particle attempting to diffuse into the body of the solid particle of the adsorbent will pass into the capillary opening and may have its positive electrical charge neutralized by the negative charge of the clay and be deposited on it.

In general, the action of a catalytic agent is not fully understood, but we are of the opinion however that, when used in our process, one or more of the following actions take place: First, that the catalyst or catalytic agent in the presence of steam tends to polymerize more rapidly and completely the unsaturated, asphaltic, tarry, bituminous and similar substances into forms of higher molecular residues, thereby rendering these materials more susceptible to adsorption. Secondly, the catalyst in the presence of steam may effect the surface of the adsorbent in such a manner as to increase its influence on the surface tension of the oil, thereby increasing the concentration of the soluble impurities in the surface layer of the oil so that when the solution is removed from the solid adsorbent more of the soluble impurities will remain attached to the adsorbent and be removed from the oil.

The preferred process of our invention is more readily understood by referring to the accompanying drawings which illustrate, diagrammatically, the form of an apparatus by which the preferred process of our invention may be conducted.

In the drawing 1 represents a line from the wet clay storage tank to pump 5 through valve 2. 3 represents a line from the acid oil storage tank also leading to pump 5 through valve 4. Pump 5 discharges into agitator 6 which is equipped with mechanical stirrers. The agitator 6 is discharged through valve 7 and pump 8 to the heating coils 9 which empty into vapor separator 11 through pipe 10. Steam is admitted to the vapor separator 11 through valve 13 from steam line 15 and steam and vapor escape from the vapor separator 11 through the vapor outlet 12 into the vapor outlet line 22. The vapor separator is discharged through valve 14 into cooling tank 16 and from there the oil and clay mixture is passed into the filter feed tank through valve 17, pump 18 and pipe 19. 21 represents a pipe leading from the filter feed tank to the filters, centrifuges or other mechanical device for separating the spent filtering material from the oil.

With the apparatus in the form shown in the drawing the process is conducted as follows:

From the wet clay storage tank and the acid oil storage tank the proper mixture of wet clay, with or without a catalytic agent, and acid oil is drawn into the agitator 6 through valves 2 and 4 respectively by means of pump 5. The wet clay and oil are thoroughly intermixed in the agitator by means of mechanical or other agitation and then the mixture is drawn from the agitator 6 through valve 7 and passed through the heating coils by means of pump 8 as slowly as is convenient without heating the mixture to a temperature in excess of the boiling point of the oil being treated. From the heating coils 9 the mixture passes into the vapor separator 11 through pipe 10 and is steamed down to a temperature somewhat in excess of the boiling point of water by means of steam admitted into the bottom of the vapor separator 11 through valve 13, the steam and vapors escaping from the separator through outlet 12.

From the vapor separator 11 the partially cooled mixture is discharged into the cooling tank 16, or other suitable cooling device, where the mixture is further cooled to the desired temperature for separating the spent filtering material from the oil. From the cooling tank 16 the cold or semi-cooled mixture is pumped into the filter feed tank 20 through valve 17 and pipe 19 by means of pump 18. From there the mixture of oil and filtering material is fed to filters, centrifuges or other mechanical device for removing the spent filtering material from the oil.

What we claim is:

1. An improved process of decolorizing, clarifying and purifying petroleum oils which consists in mixing the oil by any suitable means with untreated, finely divided clays containing enough water to form a viscous, cohesive mass sufficiently fluid to be pumped through pipes, passing the mixture through a suitable heating device without heating the mixture to a temperature in excess of the boiling point of the oil being treated, then steaming down the hot oil and clay mixture to a temperature somewhat in excess of the boiling point of water and drawing off the vapors with the spent steam, further cooling the mixture to the desired temperature for separating the spent filtering material from the oil and separating the spent filtering material from the oil.

2. An improved process of decolorizing, clarifying and purifying petroleum oils which consists in mixing the oil by any suitable means with untreated finely divided clays containing zinc chloride as a catalytic agent and enough water to form a viscous, cohesive mass sufficiently fluid to be pumped through pipes, passing the mixture through a suitable heating device without heating the oil and clay mixture to a temperature in excess of the boiling point of the oil being treated, steaming down the hot oil and clay mixture to a temperature somewhat in excess of the boiling point of water, and further cooling the mixture to the desired temperature for separating the spent filtering material from the oil.

3. An improved process of decolorizing, clarifying and purifying petroleum oils which consists in mixing the oil by any suitable means with untreated finely divided clays containing from 30% to 500% by weight of water to clay, passing the mixture through a suitable heating device without heating the mixture to a temperature in excess of the boiling point of the oil being treated, then steaming down the hot oil and clay mixture to a temperature somewhat in excess of the boiling point of water and drawing off the vapors with the spent steam, further cooling the mixture to the desired temperature for separating the spent filtering material from the oil and separating the spent filtering material from the oil.

4. An improved process of decolorizing, clarifying and purifying petroleum oils which consists in mixing the oil by any suitable means with untreated finely divided clays and clay-like filtering materials containing from 30% to 500% of weight of water to clay and zinc chloride as a catalytic agent, passing the mixture through a suitable heating device without heating the mixture to a temperature in excess of the boiling point of the oil being treated, steaming down the hot oil and clay mixture to a temperature somewhat in excess of the boiling point of water, further cooling the mixture to the desired temperature for separating the spent filtering material from the oil and separating the spent filtering material from the oil.

5. The herein described method of decolorizing and purifying petroleum oils which consists of mixing the oil to be treated with a viscous mass of finely divided untreated clay and water in the presence of zinc chloride and thereafter heating the mixture to a point in excess of the boiling point of water.

6. The herein described step in decolorizing and purifying petroleum oils which consists of intermixing the oil to be treated with a filtering material consisting of water and finely divided untreated clay in the proportion of 30% to 500% by weight of water to clay and zinc chloride as a catalytic material.

In testimony whereof we hereunto affix our signatures.

HAROLD LESTER KAUFFMAN.
IRWIN ARTHUR CLARK.